United States Patent [19]

Mueller

[11]  3,855,240

[45]  Dec. 17, 1974

[54] SULFUR CONTAINING HETEROCYCLES

[75] Inventor: Wolfgang H. Mueller, Elizabeth, N.J.

[73] Assignee: Exxon Research and Engineering Company, Linden, N.J.

[22] Filed: Apr. 28, 1969

[21] Appl. No.: 819,944

[52] U.S. Cl. ............................................. 260/327 P
[51] Int. Cl. ............................................ C07d 73/00
[58] Field of Search ................................ 260/327 P

[56] References Cited
OTHER PUBLICATIONS

Kalff, et al., Chem. Abs. 65:15202 (11–66).

Brintzinger, et al., Chem. Ber. 85:338–343 (1952).

*Primary Examiner*—Henry R. Jiles
*Assistant Examiner*—C. M. S. Jaisle
*Attorney, Agent, or Firm*—Robert J. Baran

[57] ABSTRACT

Halogen substituted 1,4-dithiane and 1,4-dithiene compounds are produced through the cycloaddition of bis-sulfenyl halides to acetylenic compounds. The reaction is conducted in the liquid phase at moderate temperatures and atomospheric pressure. The dithiane and dithiene compounds may be employed as lubricating oil additives and as precursors to insecticidal toxicants.

14 Claims, No Drawings

SULFUR CONTAINING HETEROCYCLES

BACKGROUND OF THE INVENTION

1. Field of the Invention

This invention relates to halogen substituted dithiane and dithiene compounds and to a process for their formation. More particularly, the invention relates to 1,4-dithiane and 1,4-dithiene compounds containing halogen substitution and to a liquid phase cycloaddition process for their formation.

2. Description of the Prior Art

Sulfur containing heterocyclic compounds are known articles of commerce. Various types of halogenated dithiane materials have been previously prepared. Generally, the materials are synthesized by the addition of chlorine gas to dithiane in the presence of a diluent such as carbon tetrachloride (see U.S. Pat. No. 2,766,168). The existence of various types of organo substituted dithiane compositions has also been reported (see U.S. Pat. No. 2,900,392). These compositions were prepared through the reaction of an organic thiocyanate with an epoxy or epithio compound.

SUMMARY OF THE INVENTION

In accordance with the present invention, it has been discovered that sulfur containing heterocyclic compounds, specifically halogen substituted dithiane and dithiene compounds, can be produced through the cycloaddition of ethane-1,2-disulfenyl chlorides or bromides to acetylenic compounds. The reaction is conducted in the liquid phase, normally in the presence of a solvent. The addition reaction is carried out at moderate temperatures and pressures.

The processes contemplated by the instant invention are illustrated by the equations set forth below:

thiane. Equation II represents the reaction of a bis-sulfenyl halide with a monosubstituted acetylenic compound to arrive at a mono-halogenated dithiene compound. Lastly, Equation III illustrates the reaction of bis-sulfenyl halide with a di-substituted acetylenic compound to synthesize a dithiane containing organo and halogen substitution at the 2- and 3- positions. In each of the reactions, the halogenated dithiane and dithiene materials are the predominant (greater than 50 mole %) products secured.

As noted in the above equations, the starting ethane-1,2-disulfenyl halide possesses the general formula:

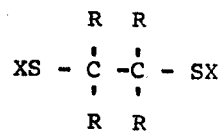

wherein X designates a chlorine or bromine atom, preferably a chlorine atom and R represents a hydrogen atom; a halogen atom, preferably a chlorine or bromine atom; a carboxyl radical (—COOH); or a substituted or unsubstituted hydrocarbyl radical having from 1 to 20, preferably from 1 to 12 carbon atoms. Useful hydrocarbyl radicals include alkyl radicals having from 1 to 6 carbon atoms, such as ethyl, t-butyl, cyclopentyl, and n-hexyl, etc.; phenyl radicals; alkylaryl radicals having from 7 to 16 carbon atoms, e.g., ethylphenyl, tolyl, n-octylphenyl, trimethylphenyl, etc.; and aralkyl radicals having from 7 to 16 carbon atoms such as benzyl, 3-phenylpropyl, etc. The hydrocarbyl radicals may contain additional substituents that do not interfere with the reaction and which may provide additional reactive sites to the ultimate dithiane and dithiene compounds. Applicable substituents include halogen atoms, e.g., chlorine and bromine atoms, hydroxyl radicals, car-

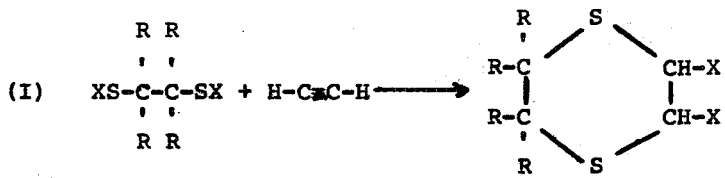

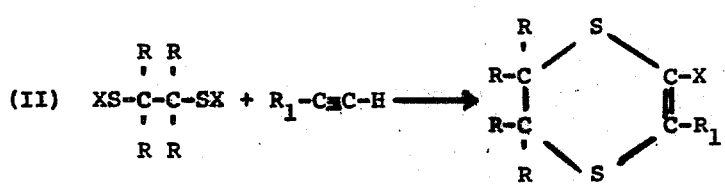

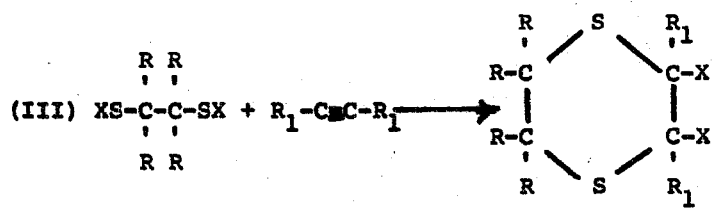

Equation I illustrates the reaction of bis-sulfenyl halide with acetylene to secure a 2-, 3- di-halogenated dithiane.

boxyl radicals (—COOH), alkyl and aryl ether radicals (—OR') having from 1 to 8 carbon atoms; alkyl and aryl acylate radicals, (—OOC—R'), having from 1 to 8 carbon atoms, etc.

It is preferable that at least two of the R values of the bis-sulfenyl halides be hydrogen atoms since the cycloaddition reaction tends to proceed to higher product yields when the starting bis-sulfenyl halide reagent does not contain a large degree of branching. The bis-sulfenyl halide reagent is prepared by the chlorination or bromination of the corresponding organic dithiol or thiol acetate. Normally, the halogenation reaction is conducted at temperatures ranging from —50° to 0°C. in a solvent such as methylene chloride. The preferred halogenation agents are chlorine, bromine and sulfuryl chloride. Examples of useful ethane-1,2-disulfenyl halides include: ethane-1,2-disulfenyl chloride; butane-1,2-disulfenyl chloride; para-nitrophenylpropane-1,2-disulfenyl chloride; 3-chloropropionic acid-2,3-disulfenyl chloride; ethylbenzene-1,2-disulfenyl chloride, etc.

As noted above, acetylene, mono-substituted acetylenic and di-substituted acetylenic compounds are employed in the cycloaddition reaction as the second process reagent. The mono-substituted and di-substituted reagents possess the general formulae:

$$R_1 — C \equiv CH$$

$$R_1 — C \equiv C — R_1$$

wherein $R_1$ is a monovalent radical, preferably a chlorine atom; a carboxyl radical; an alkyl or aryl ether (—OR') radical having from 1 to 8 carbon atoms; alkyl and aryl acylate radicals having from 1 to 8 carbon atoms; or a $C_1$-$C_{20}$, preferably $C_1$-$C_{12}$ hydrocarbyl radical of the type represented by the symbol R. The expression "acetylenic compound" as used herein is meant to include acetylene, mono-substituted acetylenic compounds and di-substituted acetylenic compounds. Representative, non-limiting examples of useful acetylenic compounds include: 1-butyne, 2-butyne, phenyl acetylene, diphenyl acetylene, propriolic acid or propriolates, acetylene dicarboxylic acid or its esters, chloro-acetylene, dichlorophenyl-2-butyne, etc.

The cycloaddition reaction is conducted in the liquid phase. Preferably, the reaction is conducted in the presence of an inert organic diluent that is mobile at reaction conditions. It is desirable that inert polar materials such as $C_1$-$C_6$ halogenated hydrocarbons; $C_4$-$C_8$ acyclic and alicyclic aliphatic ethers; $C_2$-$C_6$ alkyl ketones; $C_1$-$C_4$ alkanols and glycols; or $C_3$-$C_8$ aliphatic esters be employed as the process diluent. Useful solvent materials include ethyl acetate, methylene dichloride, glyme, diglyme, tetrahydrofuran, diethylether, acetone, isopropanol, ethylene glycol, etc. It is preferred that large quantities of solvents be employed relative to the process reactants. Generally from 2 to 50 volumes of solvent are used per combined volume of process reagents. With the preferred reaction procedure, substantially equal molar amounts of the sulfenyl halide and the acetylenic compounds are slowly and simultaneously introduced into the solvent contained within the reaction zone. The sulfenyl halide may be introduced as a solution in a solvent. Similarly, the acetylenic compound may be introduced into the reaction zone as a solution or in its gaseous state in the case of the lower acetylenic compounds, e.g., acetylene, methyl acetylene, etc. Alternatively, the acetylenic compound may be slowly introduced into a dilute solution of the sulfenyl halide material.

The cycloaddition reaction proceeds well in the absence of any catalyst material. Typically, the reaction is conducted with substantially equal molar amounts of the two reactants being present within the reaction zone. An excess of either of the two reagents may be employed; however, the molar ratio of the acetylenic compound to the sulfenyl halide reactant is most preferably maintained between 1.2:1 and 1:1.2.

The reaction is carried out at temperatures ranging from about —50° to 50°C. and most preferably between —10 and +25°C. Reaction zone pressure is not a critical process variable. Normally, the addition reaction is conducted at atmospheric pressure. However, when volatile reactants and/or solvents are employed, higher reaction zone pressures can be used without adverse effect. The addition reaction is substantially instantaneous; hence, prolonged reaction periods are not necessary and substantial product yields are secured within 0.2 to 2.0 hours.

The dithiane and dithiene composition have many varied uses. They may be used per se as lubricating oil additives. Further, they may be reacted with diesters of dithiophosphoric acids to arrive at useful insecticidal toxicants.

DESCRIPTION OF THE PREFERRED EMBODIMENTS

The following embodiments are submitted to more particularly point out the invention.

EXAMPLE 1

A solution of 65 grams (0.4 mole) of ethane-1,2-disulfenyl chloride contained in approximately 150 milliliters of ethyl acetate was slowly introduced into 250 milliliters of ethyl acetate contained within a glass reaction vessel. Simultaneously, gaseous acetylene was introduced into the reaction vessel at atmospheric pressure at a rate of 4.8 liters per hour. The addition was carried out at room temperature and reagent addition was continued over a period of 2 hours. A chilled dropping funnel was used to minimize decomposition of the sulfenyl chloride. Upon completion of the addition, solvent was removed with a rotary evaporator and a semisolid product recovered.

Nuclear magnetic resonance (Nmr) spectral analysis of the crude product indicated that it consisted of about 70 mole % of trans-2,3-dichloro-1,4-dithiane and 30 mole % 2-chloro-1,4-dithiene. The crude product mixture was redissolved in one liter of chloroform and small amounts of insoluble product material were removed by passing the mixture through a bed of filter aid. Concentration of the filtrate and addition of pentane resulted in the recovery of 45.6 grams (60.4% yield) of the trans 2,3-dichloro-1,4-dithiane product. The product exhibited a melting point of 127°–129°C. The identity of the product was confirmed through comparison of its Nmr spectrum with the spectrum of an authentic sample.

EXAMPLE 2

A solution of 32.5 grams (0.2 mole) of ethane-1,2-disulfenyl chloride in 150 milliliters of methylene dichloride and gaseous methyl acetylene were simultaneously introduced into 250 milliliters of methylene dichloride contained within a glass reaction vessel. The gaseous methyl acetylene was introduced at about atmospheric pressure at a rate of 4.8 liters per hour. The reaction was carried out in the same manner as in Example 1. Upon completion of the addition, approximately 35 grams of a tan liquid product was recovered. Distillation of this liquid under vacuum conditions yielded 27 grams (81% yield) of pure 2-chloro-3-methyl-1,4-dithiene. The dithiene product was found to have a boiling point of 83°C. at 0.08 millimeters of mercury pressure. The product was found to be composed of 36.07 wt. % carbon, 4.3 wt. % hydrogen, and 38.54 wt. % sulfur. The product thought to have been obtained would contain 36.03 wt. % carbon, 4.23 wt. % hydrogen, and 38.47 wt. % sulfur.

EXAMPLE 3

To a solution of 32.5 grams (0.2 mole) of ethane-1,2-disulfenyl chloride contained in 1700 milliliters of methylacetate contained in a glass reaction vessel was added 12 grams (0.22 mole ) of butyne-2 dissolved in 100 milliliters of ethylacetate. The addition was carried out at room temperature over a period of 3 hours. Upon completion of the addition, the solution was concentrated using a rotary evaporator and a residual semi-solid product recovered. This product was subsequently dissolved in 800 milliliters of CHCl$_3$. Filtration of this solution through a bed of filter aid served to remove some insoluble reaction material. Removal of solvent from the product resulted in the recovery of 57.4 grams of a semi-solid tan material. Nuclear magnetic resonance spectral anaylsis of this crude product indicated that it was composed of about 82 mole % of 2,3-dichloro-2,3-dimethyl-1,4-dithiane. Crystallization and recrystallization of the crude product from chloroform-pentane afforded 20.75 grams of the dithiane product. The product exhibited a melting point between 86°and 89°C. Additionally, it was found to be composed of 33.53 wt. % carbon, 4.77 wt. % hydrogen, and 29.44 wt. % sulfur. The product thought to have been secured would have contained 33.18 wt. % carbon, 4.64 wt. % hydrogen, and 29.53 wt. % sulfur.

EXAMPLE 4

Following the general procuedure of Example 1, 0.3 mole of butane-1,2-disulfenyl chloride and 0.3 mole of phenyl acetylene are simultaneously introduced into ethyl acetate contained within a glass reaction vessel. The addition is carried out at about 0°C. over a 3-hour period. From the reaction, a 2-chloro-3-phenyl-5,6-dimethyl-1,4-dithiene is recovered.

EXAMPLE 5

Following the general procedure of Example 1, substantially equal molar amounts of 1,2-diphenyl ethane-1,2-disulfenyl chloride and 5-chloro-pentyne-2 are continuously introduced into methyl acetate contained within a glass reaction vessel. The addition is conducted at about −10°C. for 2.5 hours. Upon completion of the addition a product composed predominantly of 2,3-dichloro-2-chloroethyl-3-methyl-5,6-diphenyl-1,4-dithiane is recovered.

What is claimed is:

1. A process for the preparation of heterocyclic dithianes and dithienes which comprises reacting, in the liquid phase, 1,2-disulfenyl halide with an acetylenic compound and thereafter recovering said sulfur containing heterocyclic compound.

2. The process of claim 1 wherein said ethane-1,2-disulfenyl halide compound is selected from the group consisting of ethane-1,2-disulfenyl chloride compounds and ethane-1,2-disulfenyl bromide compounds.

3. The process of claim 1 wherein said reaction is conducted at a temperature ranging from −50° to 50°C.

4. The process of claim 1 wherein said acetylenic compound is acetylene.

5. The process of claim 1 wherein said acetylenic compound is a material having the general formula:

wherein R$_1$ is a monovalent radical selected from the group consisting of a chlorine atom, a carboxyl radical, an acylate radical having from 1 to 8 carbon atoms, an ether radical having from 1 to 8 carbon atoms, and substituted and unsubstituted hydrocarbyl radicals having from 1 to 20 carbon atoms.

6. The process of claim 1 wherein said disulfenyl halide compound has the general formula:

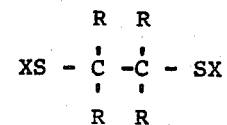

wherein X is selected from a group consisting of chlorine and bromine atoms and R is a monovalent radical selected from the group consisting of hydrogen atoms, halogen atoms, carboxyl radicals, and substituted and unsubstituted hydrocarbyl radicals having from 1 to 20 carbon atoms.

7. A process for the preparation of heterocyclic dithiane and dithiene compounds which comprises reacting, in the presence of a solvent, an ethane-1,2-disulfenyl halide compound having the general formula:

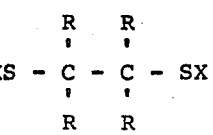

wherein X is selected from the group consisting of chlorine and bromine atoms and R is a monovalent radical selected from the group consisting of halogen atoms, hydrogen atoms, carboxyl radicals, and substituted and unsubstituted hydrocarbyl radicals having from 1 to 20 carbon atoms with an acetylenic compound selected from the group consisting of acetylene, and monosubstituted and di-substituted acetylenic compounds having the general formulae:

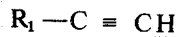

wherein R$_1$ is a monovalent radical selected from the group consisting of a chlorine atom, an alkyl acylate radical having from 1 to 8 carbon atoms, an alkyl ether radical having from 1 to 8 carbon atoms, and substituted and unsubstituted hydrocarbyl radicals having from 1 to 12 carbon atoms, said reaction conducted at a temperature ranging from −50° to 50°C. and thereafter recovering said heterocyclic compound.

8. The process of claim 7 wherein X is a chlorine atom.

9. The process of claim 8 wherein said acetylenic compound is acetylene.

10. The process of claim 8 wherein $R_1$ is a monovalent alkyl radical having from 1 to 6 carbon atoms.

11. The process of claim 8 wherein R is a hydrogen atom.

12. The process of claim 7 wherein said reaction is conducted in the presence of from 2 to 50 volumes of a polar solvent per the combined volume of said disulfenyl halide compound and said acetylenic compound.

13. The process of claim 11 wherein $R_1$ is a methyl radical.

14. A process for the preparation of dithianes which comprises reacting, in the liquid phase, a disulfenyl halide compound having the general formula

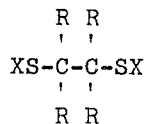

wherein X is selected from a group consisting of chlorine and bromine atoms and R is a monovalent radical selected from the group consisting of hydrogen atoms, halogen atoms, carboxyl radicals, and substituted and unsubstituted hydrocarbyl radicals having from 1 to 20 carbon atoms, with an acetylenic compound having the general formula $R_1$—C ≡ C—R, wherein $R_1$ is a monovalent radical selected from the group consisting of a chlorine atom, a carboxyl radical, an acylate radical having from 1 to 8 carbon atoms, an ether radical having from 1 to 8 carbon atoms, and substituted and unsubstituted hydrocarbyl radicals having from 1 to 20 carbon atoms.

* * * * *